United States Patent [19]

Gluck et al.

[11] Patent Number: 5,124,366
[45] Date of Patent: Jun. 23, 1992

[54] POLYISOCYANURATE FOAMS MADE WITH POLYESTER POLYOLS AND CHLORODIFLUOROMETHANE AS A BLOWING AGENT

[75] Inventors: David G. Gluck; John P. Oliver, both of St. Petersburg, Fla.

[73] Assignee: The Celotex Corporation, Tampa, Fla.

[21] Appl. No.: 608,855

[22] Filed: Nov. 5, 1990

[51] Int. Cl.$^5$ ............................................. C08G 18/14
[52] U.S. Cl. ........................................ 521/99; 521/128; 521/131; 427/155; 427/373; 428/77; 428/423.1
[58] Field of Search ................. 521/99, 128, 131; 427/155, 373; 428/77, 423.1

[56] References Cited

U.S. PATENT DOCUMENTS

| | | | |
|---|---|---|---|
| 3,391,093 | 7/1968 | Frost | 260/2.5 |
| 3,745,203 | 7/1973 | Harper | 264/48 |
| 4,205,136 | 5/1980 | Ohashi et al. | 521/118 |
| 4,258,141 | 3/1981 | Jarre et al. | 521/114 |
| 4,407,982 | 10/1983 | Elgie | 521/122 |
| 4,568,702 | 2/1986 | Mascioli | 521/112 |
| 4,572,865 | 2/1986 | Gluck et al. | 428/309.9 |
| 4,636,529 | 1/1987 | Crooker | 521/131 |
| 4,735,970 | 4/1988 | Sommerfeld et al. | 521/128 |
| 4,753,967 | 6/1988 | Londrigan | 521/172 |
| 4,760,099 | 7/1988 | Canaday et al. | 521/110 |
| 4,795,763 | 1/1989 | Gluck et al. | 521/99 |
| 4,923,654 | 5/1990 | Freeland | 264/53 |
| 4,927,863 | 5/1990 | Bartlett et al. | 521/131 |
| 4,945,119 | 7/1990 | Smits et al. | 521/131 |

FOREIGN PATENT DOCUMENTS

WO89/00594 1/1989 Denmark .
2007590A 5/1979 United Kingdom .

OTHER PUBLICATIONS

Fiorentini, C., et al., "Manufacturing Rigid PUR Foam Without CFCs", Translated from Kunststoffe 79(1989)12, pp. 1299–1302 (+ untranslated article).

*Primary Examiner*—Maurice J. Welsh
*Attorney, Agent, or Firm*—Charles W. Vanecek

[57] ABSTRACT

A process for the manufacture of a rigid, closed-cell polyisocyanurate foam from a foam forming mixture comprising an organic polyisocyanate, a polyol, a blowing agent, and a catalyst, utilizing a polyester polyol as the sole polyol, and chlorodifluoromethane or a mixture of chlorodifluoromethane and at least one co-blowing agent as the blowing agent.

19 Claims, 1 Drawing Sheet

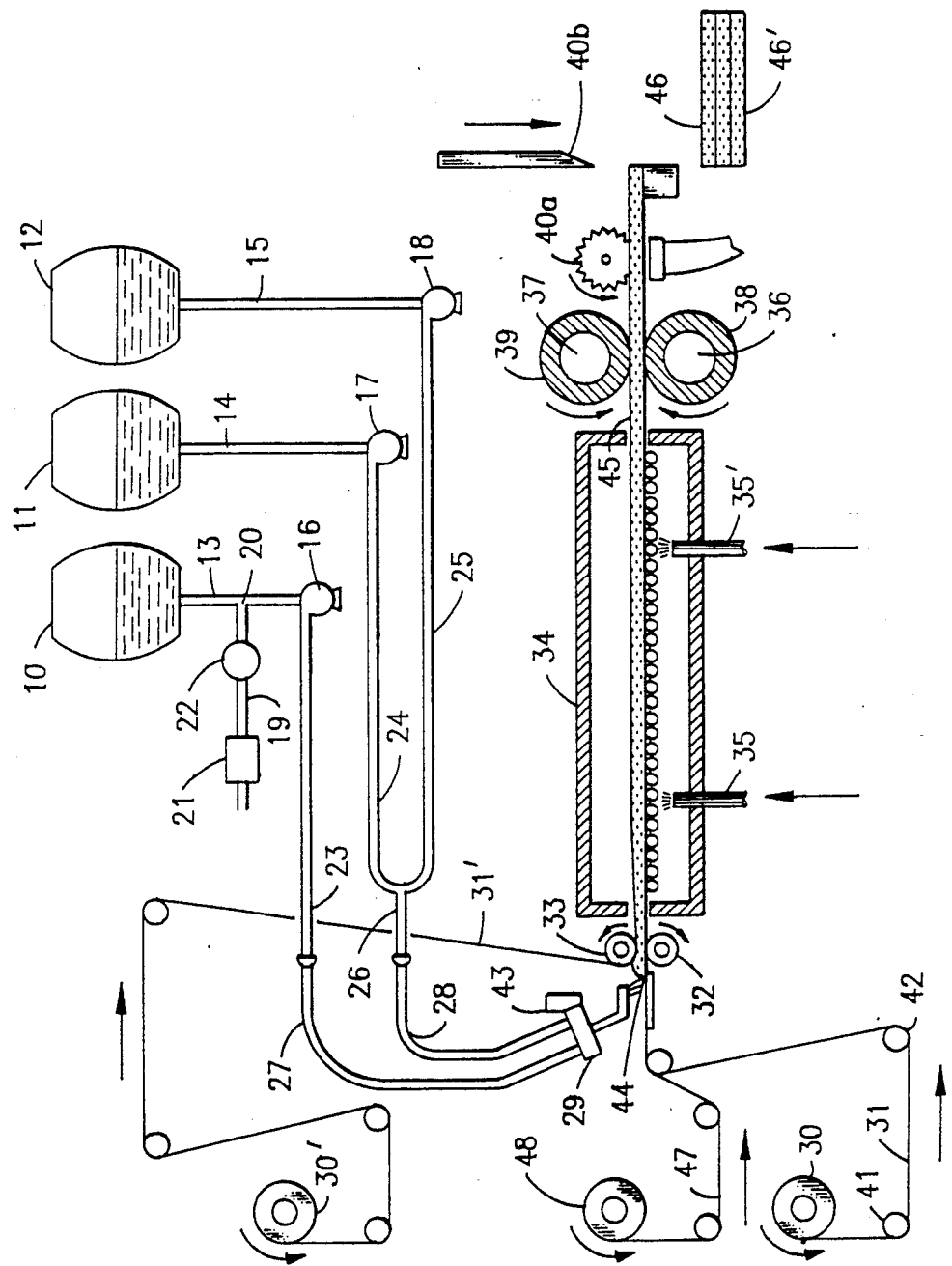

POLYISOCYANURATE FOAMS MADE WITH POLYESTER POLYOLS AND CHLORODIFLUOROMETHANE AS A BLOWING AGENT

BACKGROUND OF THE INVENTION

1. Field of the Invention

This invention relates to the manufacture of polyisocyanurate foams from a foam-forming composition containing a polyester polyol and a blowing agent comprising (a) chlorodifluoromethane (HCFC-22) or (b) a mixture of HCFC-22 with at least one other blowing agent.

2. Description of the Prior Art

It is well known in the manufacture of rigid polyurethane and polyisocyanurate foams to employ fluorocarbons, such as trichlorofluoromethane, as the blowing agent. These fluorocarbon compounds boil or exhibit a significant vapor pressure at ambient temperatures and are volatilized during the exothermic reaction of an isocyanate with an active hydrogen-containing compound, such as a polyol. The expanding gas is entrapped within the reaction mixture and forms a cellular structure. While the foam industry has had good results using the conventional fluorocarbon blowing agents, the agents have come under attack in recent years on the ground that they give rise to environmental problems concerned with ozone depletion in the stratosphere. Accordingly, the search is ongoing for alternative blowing agents which are less hazardous to the environment.

The use of polyester polyols (e.g., aromatic polyester polyols) as low cost polyol extenders in the production of the rigid polyurethane and polyisocyanurate foams is also well known. Since these polyols can contribute unique properties to the foam, such as low flammability and low smoke, it is desirable to maximize their content in the polyol component of a foam-forming composition. Unfortunately, a common problem with these polyester polyols is that they characteristically are poorly compatible with the conventional fluorocarbon blowing agents.

Various compatibilizing co-polyols have been developed to overcome this incompatibility problem and achieve higher levels of polyester polyols in the polyol component. A particularly advantageous approach, which also involves use of an alternative blowing agent characterized by a low ozone depletion potential, is provided by U.S. Pat. No. 4,636,529, wherein chlorodifluoromethane is substituted for a portion of the conventionally used dichlorodifluoromethane and trichlorofluoromethane blowing agents. The patent discloses that this blowing agent substitution permits the proportion of the aromatic polyester polyol in the polyol component of the foam system to be increased and exemplifies the production of foams wherein the aromatic polyester polyol constitutes 50 weight % of this component. The foam system is doubly benefitted due to the increased amount of aromatic polyester polyol and the inclusion of the chlorodifluoromethane, a hydrogen-containing chlorofluorocarbon, whose relatively short lifetime in the atmosphere presents a reduced risk of ozone depletion.

Despite such advances in the art, there is still a need for improved foam systems which provide increased use of both polyester polyols and more acceptable fluorocarbon substitutes.

OBJECTS OF THE INVENTION

It is therefore an object of the present invention to provide an improved polyisocyanurate foam from a foam-forming composition which contains both a polyester polyol and a blowing agent having reduced ozone depletion potential.

It is another object of the present invention to produce an improved rigid polyisocyanurate foam material having a combination of advantageous properties, including a high degree of fire resistance with low smoke evolution and flame spread on combustion.

It is still another object of the present invention to provide a blowing agent which reduces the use of fully halogenated materials in polyisocyanurate foam production, and a method of employing the blowing agent in such production.

It is a still further object of the present invention to provide rigid foam materials which can be used in building panels which are highly insulating, thermally resistant, low in friability, soundproof and self-supporting.

BRIEF DESCRIPTION OF DRAWING

The invention will now be described with reference to the accompanying drawing which is a side schematic representation of an apparatus suitable for producing a polyisocyanurate foam material in accordance with the present invention.

DESCRIPTION OF THE INVENTION

The above objects have been achieved through the use of chlorodifluoromethane ($CHClF_2$), also known as HCFC-22, as a low boiling extender in a blowing agent mixture or as the principal or sole blowing agent for the formation of rigid polyisocyanurate foams. The improved foams of the invention advantageously comprise polyisocyanurate foams prepared by reacting together a polyisocyanate and a polyester polyol, preferably an aromatic polyester polyol, in the presence of $CHClF_2$ or a $CHClF_2$-containing blowing agent mixture. The foaming reaction may be carried out in the presence of catalysts, auxiliaries and additives.

The $CHClF_2$ may comprise from 1 to 100 percent, by weight, based on the total weight of the blowing agent(s) used, such as, e.g., from about 5 to 100 weight percent. To take particular advantage of the low ozone depletion potential of $CHClF_2$, it preferably is used as the major blowing agent component in the foam preparations and can comprise from about 50 to 100 weight percent, based on the total blowing agent content of the foam-forming composition. It has been found that the use of $CHClF_2$, either alone or together with conventional blowing agents such as trichloromonofluoromethane, carbon dioxide, dichlorofluoroethane, and dichlorotrifluoroethane, in conjunction with the polyester polyols of the invention results in closed cell foam materials characterized by outstanding properties, including excellent cellular formation, low friability, good dimensional stability, low flammability, and low thermal conductivity. The contribution of the $CHClF_2$ to foam insulation value has been found to be out of proportion to this blowing agent's thermal conductivity per se. Foaming with mixtures of $CHClF_2$ and $CCl_3F$ results in rigid polyisocyanurate foams whose thermal conductivities are unexpectedly close to those obtained using $CCl_3F$ as the sole blowing agent. The use of CHClF$_2$ alone as the blowing agent also has resulted in an unexpectedly low thermal conductivity.

The polyisocyanate component employed in the preparation of the cellular polymers of the invention can be any of the polyisocyanates known to be useful in the art of polymer formation. The organic di-or polyisocyanates of the invention include aliphatic, cycloaliphatic, araliphatic, aromatic and heterocyclic polyisocyanates and combinations thereof characterized in having two or more isocyanate (NCO) groups per molecule.

Among the many isocyanates suitable for the practice of the subject invention are, for example, tetramethylene, hexamethylene, octamethylene and decamethylene diisocyanates, and their alkyl substituted homologs, 1,2-, 1,3- and 1,4-cyclohexane diisocyanates, 2,4- and 2,6-methylcyclohexane diisocyanates, 4,4'- and 2,4'-dicyclohexyldiisocyanates, 4,4'- and 2,4'-dicyclohexylmethane diisocyanates, 1,3,5-cyclohexane triisocyanates, saturated (hydrogenated) polymethylenepolyphenylenepolyisocyanates, isocyanatomethylcyclohexane isocyanates, isocyanatoethylcyclohexane isocyanates, bis(isocyanatomethyl)-cyclohexane diisocyanates, 4,4'- and 2,4'-bis(isocyanatomethyl) dicyclohexane, isophorone diisocyanate, 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'- diphenylmethane diisocyanates, polymethylenepolyphenylene-polyisocyanates (polymeric MDI), and aromatic aliphatic isocyanates such as 1,2-, 1,3-, and 1,4-xylylene diisocyanates.

Organic isocyanates containing heteroatoms may also be utilized, for example those derived from melamine. Modified polyisocyanates, such as carbodiimide or isocyanurate can also be employed. Liquid carbodiimide group- and/or isocyanurate ring-containing polyisocyanates having isocyanate contents from 15 to 33.6 percent by weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4', and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates and polyisocyanates. Particularly preferred are 2,4-, and 2,6-toluene diisocyanate and mixtures thereof (TDI), 2,4'-, 2,2'- and 4,4'-diphenylmethane diisocyanate (MDI), polymethylenepolyphenylenepolyisocyanates (polymeric MDI), and mixtures of the above preferred isocyanates.

Most particularly preferred are the polymeric MDI's.

Still other useful organic polyisocyanates are isocyanate terminated quasi-prepolymers. These quasi-prepolymers are prepared by reacting excess organic polyisocyanate or mixtures thereof with a minor amount of an active hydrogen-containing compound. Suitable active hydrogen containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane oligomers, polyhydric polythioethers, ethylene oxide adducts of phosphorous-containing acids, polyacetals, aliphatic polyols, aliphatic thiols including alkane, alkene and alkyne thiols having two or more SH groups; as well as mixtures thereof. Compounds which contain two or more different groups within the above-defined classes may also be used such as, for example, compounds which contain both an SH group and an OH group. Highly useful quasi-prepolymers are disclosed in U.S. Pat. No. 4,791,148 and U.S. application Ser. No. 07/342,508, filed Apr. 24, 1989, the disclosures of which with respect to the quasi-prepolymers are hereby incorporated by reference.

In contradistinction to the invention described in U.S. Pat. No. 4,636,529, the foams of the present invention are prepared by reacting the polyisocyanate with a polyester polyol component, preferably an aromatic polyester polyol, without incorporation in the polyol component of the conventional copolyols added for improved compatibility with fluorocarbon blowing agents. Because they are produced without the usual compatibilizing polyols, the inventive foams are characterized by the following advantageous features: lower formulation costs, improved compressive strength properties, and enhanced flame retardancy.

The polyester polyols of the invention can be prepared by known procedures from a polycarboxylic acid component comprising a polycarboxylic acid or acid derivative, such as an anhydride or ester of the polycarboxylic acid, and any polyol component. The polyol component advantageously comprises a glycol(s) or a glycol-containing mixture of polyols. The polyacid and/or polyol components may, of course, be used as mixtures of two or more compounds in the preparation of the polyester polyols. Particularly suitable polyester polyols for use in the foam production are aromatic polyester polyols containing phthalic acid residues.

The production of the polyester polyols is accomplished by simply reacting the polycarboxylic acid or acid derivative with the polyol component in a known manner until the hydroxyl and acid values of the reaction mixture fall in the desired range. The reaction typically is performed at temperatures from about 150° C. to 250° C. for a period from about 1 to 10 hours. The reaction can be carried out as a batch process or continuously. When present, excess glycol can be distilled from the reaction mixture during and/or after the reaction, such as in the preparation of low free glycol-containing polyester polyols usable in the present invention. Normally, an effective amount of catalyst is added to promote the present reaction. Any conventional esterification or transesterification catalyst (single compound or mixture of compounds) can be used. Suitable catalysts include organotin compounds, particularly tin compounds of carboxylic acids, such as stannous octoate, stannous oleate, stannous acetate, stannous laurate, dibutyl tin dilaurate, and other such tin salts. Additional suitable metal catalysts include tetraisopropyl titanate, and other such titanate salts, and the like.

After transesterification or esterification, the reaction product can be reacted with an alkylene oxide to form a polyester polyol mixture of the invention. This reaction desirably is catalyzed. The temperature of this process should be from about 80° to 170° C., and the pressure should generally range from about 1 to 40 atmospheres.

The polycarboxylic acid component may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis glycol ester.

Polyester polyols whose acid component advantageously comprises at least about 30% by weight of phthalic acid residues are particularly useful. By phthalic acid residue is meant the group

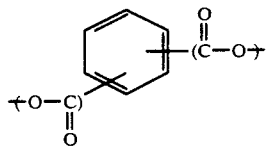

While the aromatic polyester polyols can be prepared from substantially pure reactant materials, more complex ingredients are advantageously used, such as the side-stream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate®101. DMT process residues having a different composition but still containing the aromatic esters and acids are also sold by DuPont and others. The DMT process residues to be transesterified in accordance with the present invention preferably have a functionality at least slightly greater than 2.

Such suitable residues include those disclosed in U.S. Pat. Nos. 3,647,759, 4,411,949, 4,714,717, and 4,897,429, the disclosures of which with respect to the residues are hereby incorporated by reference.

The polyester polyols are prepared from the above described polycarboxylic acid components and any polyol component. The polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols.

A preferred polyol component is a glycol. The glycols may contain heteroatoms (e.g., thiodiglycol) or may be composed solely of carbon, hydrogen, and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. In a preferred embodiment of the invention, the glycol is a low molecular weight aliphatic diol of the generic formula:

HO—R—OH wherein R is a divalent radical selected from the group consisting of:
(a) alkylene radicals each containing from 2 through 6 carbon atoms, and
(b) radicals of the formula:

—(R$^1$O)$_m$—R$^1$— wherein R$^1$ is an alkylene radical containing from 2 through 6 carbon atoms, and m is an integer of from 1 through 4, and
(c) mixtures thereof.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinol; mannitol; sorbitol; methyl glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol and tetramethylene glycol, and 1,4-cyclohexanedimethanol (1,4-bis-hydroxymethylcyclohexane).

The term "polyester polyol" as used in this specification and claims includes any minor amounts of unreacted polyol remaining after the preparation of the polyester polyol and/or unesterified polyol (e.g., glycol) added after the preparation. The polyester polyol can advantageously include up to about 40 weight percent free glycol.

The polyester polyols advantageously have an average functionality of about 1.8 to 8, preferably about 1.8 to 5, and more preferably about 2 to 2.5. Their hydroxyl number values generally fall within a range of about 15 to 750, preferably about 30 to 550, and more preferably about 100 to 550, and their free glycol content generally is from about 0 to 40, preferably from 2 to 30, and more preferably from 2 to 15, weight percent of the total polyester polyol component.

Examples of suitable polyester polyols are those derived from PET scrap and available under the designation Chardol 170, 336A, 560, 570, 571 and 572 from Chardonol and Freol 30-2150 from Freeman Chemical. Examples of suitable DMT derived polyester polyols are Terate® 202, 203, 204, 254 and 254A polyols, which are available from Cape Industries. Phthalic anhydride derived-polyester polyols are commercially available under the designation Pluracol® polyol 9118 from BASF Corporation, and Stepanol PS-2002, PS-2402, PS-2502A, PS-2502, PS-2522, PS-2852, PS-2852E, PS-2552, and PS-3152 from Stepan Company.

The polyisocyanurate foams of the present invention are prepared by reacting together the polyisocyanate and polyol components in the presence of catalysts, auxiliaries and additives as required (e.g., a surfactant), and the blowing agent composition of the invention which comprises $CHClF_2$, or a mixture of $CHClF_2$ and at least one other blowing agent, such as another halocarbon.

The blowing agent composition of the invention can comprise relatively minor amounts of $CHClF_2$, as, e.g., about 1 to 20, preferably about 5 to 15, percent by weight of the total blowing agents. However, it is also within the scope of the invention to utilize $CHClF_2$ in a greater concentration. The content of $CHClF_2$ can be progressively increased to the point where it is the major or sole blowing agent component, such as from about 60 to 100, preferably about 70 to 100, weight percent of the total blowing agent.

Any suitable co-blowing agent(s) can be employed in conjunction with $CHClF_2$ in preparing the foam compositions of the invention. Water, air, nitrogen, carbon dioxide, readily volatile organic substances and/or compounds which decompose to liberate gases (e.g., azo compounds may be used. Typically, these co-blowing agents are liquids having a boiling point between minus 50° C. and plus 100° C., and preferably between $-50°$ C. and $+50°$ C. The preferred liquids are hydrocarbons or halohydrocarbons. Examples of suitable co-blowing agents include, among others, chlorinated and fluorinated hydrocarbons such as trichlorofluoromethane, $CCl_2FCClF_2$, $CCl_2FCF_2H$, $CClFHCClF_2$, trifluorochloropropane, difluorodichloromethane, 1-fluoro-1,1-dichloroethane, 1,1,1-trifluoro-2,2-dichloroethane1,1-difluoro-1,chloroethane, fluoroalkanes, methylene chloride, diethylether, dimethylether, isopropyl ether, fluoroethers such as $CH_3OCF_2CHF_2$, and $CH_3OCF_2CHClF$, n-pentane, cyclopentane, 2-methylbutane, methyl formate, carbon dioxide and mixtures thereof. $CFCl_3$, $CFCl_2CH_3$, $CF_3CHCl_2$ and $H_2O$ are preferred co-blowing agents.

The blowing agents are employed in an amount sufficient to give the resultant foam the desired bulk density which is generally between 0.5 and 10, preferably between 1 and 5, and most preferably between 1.5 and 2.5, pounds per cubic foot. The blowing agents generally comprise from 1 to 30, and preferably comprise from 5 to 20 weight percent of the composition. When a blowing agent has a boiling point at or below ambient, it is maintained under pressure until mixed with the other components. Alternatively, it can be maintained at sub-ambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "Y-10222", "L-5420" and "L-5340", from the Dow Corning Corporation under the trade names "DC-193" and "DC-5315", and from Goldschmidt Chemical Corporation under the tradenames "B-8408" and "B-8407". Other suitable surfactants are those described in U.S. Pat. Nos. 4,365,024 and 4,529,745 and supplied by Sloss Industries Corporation under the trademarks Foamstab 100 and 200. Generally, the surfactant comprises from about 0.05 to 10, and preferably from 0.1 to 6, weight percent of the foam-forming composition.

Any catalyst that will induce reaction of the isocyanate with the polyol and will induce isocyanurate ring formation can be employed in the foam preparations of the invention. Most commonly used trimerization catalysts also function to catalyze the reaction of polyol and isocyanate to form urethane. However, a separate catalyst may, if desired, be used for urethane formation. The trimerization catalysts include metal carboxylates, tertiary amine trimerization catalysts, quaternary ammonium carboxylates, alkali metal alkoxides, alkali metal phenoxides and the like. Representative metal carboxylates are sodium and potassium formates, acetates, and 2-ethylhexanoates. Tertiary amine catalysts include 1,3,5-tris (N,N-dimethylaminopropyl)-s-hexahydrotriazine, o- and p-(dimethylaminomethyl) phenols and 2,4,6-tris(dimethylaminomethyl) phenol and the quaternary ammonium salts include N-hydroxyl-alkyl quaternary ammonium carboxylates and tetramethylammonium formate, acetate, 2-ethylhexanoate and the like. Suitable urethane catalysts include, for instance, tertiary amines such as triethyl amine or N,N-dimethylethanolamine as well as 1,4-diazabicyclo [2.2.2] octane and organo tin compounds such as dibutyltin diacetate, stannous octoate and dibutyltin dilaurate.

One preferred type of catalyst is a mixture of a tertiary amino phenol, such as 2,4,6-tris(dimethylaminomethyl)phenol (sold by Air Products and Chemicals, Inc. under the designation "TMR-30"), and an alkali metal carboxylate, such as potassium octoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another preferred catalyst system is a mixture comprising (i) a salt of a low molecular weight carboxylic acid selected from the group consisting of an alkali metal salt and an alkaline earth metal salt and mixtures thereof (e.g., potassium acetate), (ii) a salt of a higher molecular weight carboxylic acid selected from the group consisting of an alkali metal salt and an alkaline earth metal salt and mixtures thereof, the higher molecular weight carboxylic acid having from about 5 to 30 carbon atoms (e.g., potassium octoate), and (iii) a tertiary amine (e.g., 2,4,6-tris [dimethylaminomethyl] phenol). This mixture is described in U.S. Pat. No. 4,710,521, whose disclosure is hereby incorporated by reference.

The catalysts generally comprise from about 0.1 to 20, and preferably from 0.3 to 10, weight percent of the total foam-forming composition.

Other additives may also be included in the foam formulations. Included are processing aids, viscosity reducers, such as 1-methyl-2-pyrrolidinone, propylene carbonate, nonreactive and reactive flame retardants, such as tris(2-chloroethyl)-phosphate, dispersing agents, plasticizers, mold release agents, antioxidants, compatibility agents, and fillers and pigments (e.g., carbon black). The use of such additives is well known to those skilled in the art.

The present invention also provides a process for producing a laminate which comprises (a) contacting at least one facing sheet with a foam-forming mixture comprising the polyisocyanate, polyester polyol, blowing agent, catalyst, and auxiliaries and additives as required (e.g., a surfactant), and (b) foaming the foam-forming mixture. The process is advantageously conducted in a continuous manner by depositing the foam-forming mixture on a facing sheet being conveyed along a production line, and preferably placing another facing sheet on the deposited mixture. The foam-forming mixture is conveniently thermally cured at a temperature from about 20° C. to 150° C. in a suitable apparatus, such as an oven or heated mold.

Any facing sheet previously employed to produce building panels can be employed in the present invention. Examples of suitable facing sheets include, among others, those of kraft paper, aluminum, glass mats, glass reinforced organic felts, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

It is common practice in the manufacture of the rigid cellular polyisocyanurates to utilize two preformulated components, commonly called the A-component and the B-component. Typically, the A-component contains the isocyanate compound that must be reacted with the polyol of the B-component to form the foam, and the remaining foam-forming ingredients are distributed in these two components or in yet another component or components. In general, the $CHClF_2$ and/or the optional co-blowing agent(s) may be admixed with either the polyisocyanate or the polyol component or both.

One method of utilizing the $CHClF_2$ in the foam-forming process of the invention can be illustrated with reference to the apparatus shown in the drawing. The apparatus includes tanks 10, 11 and 12 for containing the foamable ingredients and additives such as isocyanate, polyol, filler, surfactant, dye, blowing agent, etc. The tanks are charged with the foam-forming mixture in whatever manner is convenient and preferred for the given mixture. For instance, in the production of an isocyanurate foam, utilizing $CHClF_2$ and a co-blowing agent for foaming, the foam-forming mixture can be divided into three liquid components, with the polyisocyanate, surfactant, and co-blowing agent such as $CFCl_3$ in tank 10, the polyol in tank 11, and the catalyst in tank 12, each respectively connected to outlet lines 13, 14 and 15. When water is used as a co-blowing agent, it is conveniently added to tank 11 or introduced into polyol line 14. The temperatures of the ingredients are controlled to ensure satisfactory processing. The lines 13, 14 and 15 form the inlet to metering pumps 16, 17 and 18. The apparatus is also provided with a storage tank (not shown) for $CHClF_2$. This tank discharges into conduit 19 which opens at "T"-intersection 20 into line 13. A check valve 21 and ball valve 22 in conduit 19 ensure no backup of material toward the $CHClF_2$ storage tank. The $CHClF_2$ instead can be introduced in the same way into line 14 or both lines 13 and 14. The pumps 16, 17 and 18 discharge respectively through lines 23, 24 and 25. Lines 24 and 25 comprise branches which open into line 26, and lines 23 and 26 are in turn respectively connected to flexible lines 27 and 28. The flexible lines 27 and 28 discharge to mixing head 29. The apparatus is also provided with a roll 30 of lower facing material 31, and a roll 30' of upper facing material 31'. Where only a lower facing material is used, the upper facing material can be replaced with a web coated with a release agent. The apparatus is also provided with metering rolls 32 and 33, and an oven 34 provided with vents 35 and 35' for introducing and circulating hot air. The apparatus also includes pull rolls 36 and 37, each of which preferably has a flexible outer sheath 38 and 39, and cutting means 40a for cutting off side excess material and 40b for severing the faced foam plastic produced into finite lengths, thereby producing discrete panels.

As an example of the operation, tank 10 is charged with the organic polyisocyanate admixed with the co-blowing agent and surfactant, and tank 11 is charged with the polyol, and tank 12 is charged with the catalyst composition. The speeds of the pumps 16, 17 and 18 are adjusted to give the desired ratios of the ingredients contained in the tanks 10, 11 and 12, whereupon these ingredients pass respectively into lines 13, 14 and 15. The $CHClF_2$ is injected into line 13 upstream of metering pump 16. The ingredients pass through lines 23, 24 and 25, as well as lines 26, 27 and 28, whereupon they are mixed in the mixing head 29 and deposited therefrom. By virtue of rotation of the pull rolls 36 and 37, the lower facing material is pulled from the roll 30, whereas the upper facing material is pulled from the roll 30'. The facing material passes over idler rollers such as idler rollers 41 and 42 and is directed to the nip between the rotating metering rolls 32 and 33. The mixing head 29 is caused to move back and forth, i.e., out of the plane of the drawing by virtue of its mounting on a reciprocating means 43. In this manner, an even amount of material can be maintained upstream of the nip between the metering rolls 32, 33. The composite structure at this point comprising lower and upper facing material 31 and 31' having therebetween a foamable mixture 44 now passes into the oven 34 and on along the generally horizontally extending conveyor. While in the oven 34, the core expands under the influence of heat added by the hot air from vents 35 and 35' and due to the heat generated in the exothermic reaction between the polyol and isocyanate in the presence of the catalyst. The temperature within the oven is controlled by varying the temperature of the hot air from vents 35, 35' in order to ensure that the temperature within the oven 34 is maintained within the desired limits of 100° F. to 300° F., and preferably 175° F. to 250° F. The foam, under the influence of the heat added to the oven, cures to form faced foam plastic 45. The product 45 then leaves the oven 34, passes between the pull rolls 36 and 37, and is cut by side edge and length cutting means 40a and 40b into finite lengths, thereby forming discrete panels 46 and 46' of the product.

Numerous modifications to the above-described apparatus will be immediately apparent to those skilled in the art. For example, the tanks 10, 11 and 12 can be provided with refrigeration means in order to maintain the reactants at subambient temperatures. In one modification, the $CHClF_2$ is not delivered into lines 13 or 14, but is admixed with the foam-forming ingredient(s) in tanks 10 and/or 11. This approach is especially advantageous for handling large amounts of the highly volatile $CHClF_2$, which can, for example, be apportioned in tanks 10 and 11 which are specially adapted (e.g., pressurized) to hold the $CHClF_2$-containing formulations.

As shown in the drawing, a reinforcing web 47 can be fed into the apparatus. Fiberglass fibers constitute a preferred web material. For example, in a preferred embodiment the reinforcing web will be the type of glass mat used in producing the structural laminate of U.S. Pat. No. 4,028,158, i.e., a thin mat of long, generally straight glass fibers. By generally following the method of foam reinforcement described in Example 1 of U.S. Pat. No. 4,028,158 and utilizing a sufficiently low $CHClF_2$ level so that the foam-forming mixture has the consistency of the liquid foamable mixture of this example, the glass mat becomes distributed within the foam core. In accordance with this embodiment, a thin mat 47 of glass fibers is fed from roll 48 toward the nip between the two rotating metering rolls 32 and 33. By virtue of rotation of the pull rolls 36 and 37, reinforcing mat 47 is pulled from its roll, through the nip of the metering rolls and downstream to form an expanded reinforcement material in the resulting structural laminate.

When the level of $CHClF_2$ in the blowing agent composition is increased to the point where the foam-forming mixture deposited on the underlying substrate during the process is in the form of a froth, an included reinforcing web, such as the thin glass mat of U.S. Pat. No. 4,028,158, will be pushed under the influence of the expanding froth to a position adjacent and interior to its associated facing sheet. In this way, a reinforcing web(s) can be placed interior to the lower or upper facing sheet or to both, as described in U.S. Pat. No. 4,572,865, the disclosure of which patent with respect to such reinforced structural laminates is hereby incorporated by reference.

The invention is further illustrated by the following examples in which all parts and percentages are by weight unless otherwise indicated.

EXAMPLE 1

This example illustrates the synthesis of polyisocyanurate foam utilizing the blowing agents $CCl_3F$ and $CHClF_2$ in a 94:6 weight ratio.

A Hennecke foam machine was employed in the foam preparation, and the following quantities of the following ingredients were combined as indicated.

| Item | Ingredient | Parts by Weight |
|---|---|---|
| A | Isocyanate[1] | 232 |
| B | $CCl_3F$ | 47 |
| C | $CHClF_2$ | 3 |
| D | Silicone surfactant[2] | 6 |
| E | Polyester polyol[3] | 68 |
| F | Catalyst[4] | 12 |

[1]Item A is a polymethylene polyphenyl isocyanate having an equivalent weight of 138, an acidity of 0.02% HCl, and a viscosity of 2,000 centipoises at 25° C., and is available from the Mobay Chemical Company under the trade name MONDUR MR-200.
[2]Item D is that supplied by the Union Carbide Corporation under the trade name Y-10222.
[3]Item E is a reaction product of phthalic anhydride and diethylene glycol (DEG) having a hydroxyl number of 178, a viscosity at 25° C. of 2,000 cps and 18% free DEG, and is supplied by Stepan Company under the trade name Stepan 3152.
[4]Item F is a mixture employed in the form of a solution in DEG in a weight ratio of 1.18 potassium acetate: 2.31 potassium octoate: 0.69 DMP-30: 5.82 DEG.

Items A, B, C and D were premixed together, metered and injected into one side of the high pressure impingement mixing chamber. Metered amounts of items E and F were injected into the other side of the mixing chamber. After mixing, all ingredients were dispensed into a box, yielding a polyisocyanurate foam.

Characteristics of the foam produced are shown in the following Table I. As can be seen from the data in the table, a polyisocyanurate foam with good physical properties can be obtained by using $CHClF_2$ as a co-blowing agent in accordance with this invention.

TABLE I

| FOAM PROPERTIES | |
|---|---|
| Reactivity, sec (Cream/Firm) | 11/28 |
| Density, lb/ft$^3$ | 1.74 |
| % Closed Cells | 86.8 |
| k-Factor Aging of 1" Thick Core Samples, Btu-in/hr-ft$^2$ - °F. | |
| 1 day | .128 |
| 15 days | .154 |
| 29 days | .162 |
| 90 days | .174 |
| 118 days | .172 |
| 148 days | .176 |
| 181 days | .174 |
| 241 days | .178 |
| 303 days | .178 |
| 369 days | .180 |

EXAMPLE 2

This example illustrates by reference to the drawing the production of structural laminates A to G of Table II below, utilizing as the blowing agent (a) CCl₃F and (b) CCl₃F and CHClF₂ in a 94:6 weight ratio.

The structural laminates were prepared from the ingredients and quantities thereof shown in Table II. For each structural laminate, tank 10 was charged with a mixture of the polyisocyanate, CCl₃F and surfactant, tank 11 was charged with the polyol, and tank 12 was charged with the catalyst. Table II shows for each laminate the top and bottom facers utilized.

Top and bottom facers and, in the case of structural laminates A and D through G, a thin mat of glass fibers (2.5 gm/ft²) were fed toward the nip of metering rolls 32 and 33, and the pumps 16, 17 and 18 were started to discharge the contents of the tanks 10, 11 and 12 into the respective feed lines to carry the ingredients to the mixing head 29. In the case of inventive insulation boards A, B, D and F, the CHClF₂ was injected into the isocyanate-containing component at an opening formed into conduit 13. The mixing head 29 deposited the foam forming mixture onto the lower facer and both upper and lower facers and foamable mixture and glass fiber mat for structural laminates A and D through G were then conveyed into the oven 34 to produce each of structural laminates A through G.

The properties shown in Table II reveal that the inventive structural laminates (A, B, D and F) are comparable in every respect to the comparative laminates. No significant diminution in foam properties was found despite the 11–14% reduction in CCl₃F content.

EXAMPLE 3

This example illustrates the synthesis of polyisocyanurate foams utilizing the blowing agents CHClF₂ and H₂O.

A Hennecke foam machine was employed to prepare the foams from the ingredients and quantities thereof listed in the following Table III. The "A-Component" ingredients were premixed together, metered and injected into one side of the high pressure impingement mixing chamber. The "B-Component" ingredients were also premixed and metered amounts of this premix and the "C-Component" were injected into the other side of the mixing chamber. After mixing, all ingredients were dispensed into a box, yielding a polyisocyanurate foam.

Characteristics of the foams produced are shown in the following Table III. As shown in the table, the combination of blowing agents contributes to the production of closed cell foams which provide high thermal resistance.

TABLE III

PREPARATION OF POLYISOCYANURATE FOAMS

| INGREDIENTS | 14% TRIMER FOAM | 16% TRIMER FOAM |
|---|---|---|
| (pts by wt) | | |
| A-Component | | |
| Mondur MR-200[1] | 227.5 | 222.8 |
| CHClF₂ | 27.4 | 21.0 |
| Surfactant[2] | 6.0 | 5.8 |
| B-Component | | |
| Chardol 170[3] | 76.9 | 78.6 |
| H₂O | 1.5 | 1.0 |

TABLE II

PRODUCTION OF STRUCTURAL LAMINATES

| INGREDIENTS | 12% TRIMER FOAMS | | | 18% TRIMER FOAMS | | | |
|---|---|---|---|---|---|---|---|
| | A[1] | B[1] | C[1] | D[2] | E[2] | F[2] | G[2] |
| (pts by wt) | | | | | | | |
| A-Component | | | | | | | |
| Mondur MR-200[3] | 183 | 183 | 183 | 221 | 221 | 221 | 221 |
| CCl₃F | 44 | 44 | 51 | 48 | 54 | 48 | 54 |
| CHClF₂ | 2.6 | 2.6 | — | 3.1 | — | 3.3 | — |
| Surfactant[4] | 2 | 2 | 2 | 2 | 2 | 2 | 2 |
| B-Component | | | | | | | |
| Polyol Chardol 170[5] | 117 | 117 | 117 | 79 | 79 | 79 | 79 |
| C-Component | | | | | | | |
| Catalyst[6] | 5.8 | 5.8 | 5.4 | 4.2 | 4.8 | 6.0 | 5.9 |
| FOAM PROPERTIES | | | | | | | |
| Thickness, in. | 1 | 1 | 1 | 2 | 2 | 1 | 1 |
| Density, lb/ft³ (Core) | 1.78 | 1.77 | 1.78 | 1.74 | 1.78 | 1.74 | 1.81 |
| % Closed Cells | 88 | 87 | 89 | 85 | 87 | 87 | 88 |
| Friability, % wt loss | 4.8 | 2.3 | 1.2 | 13.4 | 16.0 | 9.5 | 6.2 |
| Oxygen Index | 22.2 | 22.3 | 23.2 | 24.2 | 25.2 | 24.0 | 24.9 |
| E84 Test, (Product) flame spread/smoke | — | — | — | 21/145 | 15/150 | 22/87 | 17/80 |
| flame spread/smoke, (Core) | 23/73 | 23/78 | 25/69 | 20/97 | 22/82 | 20/77 | 23/54 |
| k-Factor Aging of Faced Samples, Btu-in/hr-ft²-°F. | | | | | | | |
| 1 Day | .109 | .109 | .106 | .123 | .111 | .128 | .107 |
| 14 Days | .122 | .122 | .114 | .126 | .124 | .126 | .119 |
| 71 Days | .126 | .126 | .118 | .142 | .139 | .136 | .132 |
| 180 Days | .120 | .124 | .121 | .145 | .146 | .137 | .134 |
| 336 Days | .128 | .127 | .126 | .146 | .146 | .145 | .139 |

[1]Laminates A–C faced on top by aluminum foil/kraft paper/aluminum foil trilaminate and on bottom by aluminum foil. Laminate A reinforced by glass fibers.
[2]Laminate D–G faced on top and bottom by aluminum foil and reinforced by glass fibers.
[3]Of Example 1.
[4]Of Example 1.
[5]Polyol Chardol 170 = Polyethylene terephthalate-based polyester polyol having a hydroxyl number of 224–244 and a viscosity at 25° C. of 2,500–3,100 cps. Its supplier is Chardonol.
[6]Of Example 1.

TABLE III-continued

| PREPARATION OF POLYISOCYANURATE FOAMS | | |
|---|---|---|
| INGREDIENTS | 14% TRIMER FOAM | 16% TRIMER FOAM |
| CHClF$_2$ | 9.9 | 16.1 |
| C-Component | | |
| Catalyst[4] | 16.6 | 12.4 |
| FOAM PROPERTIES | | |
| Reactivity, sec (Firm) | 36 | 33 |
| Density, lb/ft$^3$ | 1.7 | 1.9 |
| % Closed Cells | 86 | 87 |
| k-Factor Aging of 1" Thick Core Samples, Btu-in/hr-ft$^2$-°F. | | |
| 3 Days | .157 | .146 |
| 34 Days | .174 | .182 |
| 43 Days | — | .188 |
| 63 Days | .186 | — |
| 92 Days | .194 | — |

[1] Of Example 1.
[2] Of Example 1.
[3] Of Example 2.
[4] Of Example 1.

EXAMPLE 4

This example illustrates the synthesis of a polyisocyanurate foam (18% trimer) utilizing the blowing agents CHClF$_2$ and CFCl$_2$CH$_3$(HCFC-141b).

A Hennecke foam machine was employed to prepare the foam from the ingredients and quantities thereof listed in the following Table IV in accordance with the procedure described in Example 3. Characteristics of the foam produced are shown in the table. As can be seen from the data, a closed cell foam having a low thermal conductivity is obtained.

TABLE IV

| PREPARATION OF POLYISOCYANURATE FOAM | |
|---|---|
| INGREDIENTS | PARTS BY WEIGHT |
| A-Component | |
| Mondur MR-200[1] | 221 |
| CHClF$_2$ | 27 |
| CFCl$_2$CH$_3$ | 10 |
| Surfactant[2] | 6 |
| B-Component | |
| Polyol PS-2502A[3] | 79 |
| CHClF$_2$ | 10 |
| C-Component | |
| Catalyst[4] | 12.1 |
| FOAM PROPERTIES | |
| Reactivity, sec (Firm) | 28 |
| Density, lb/ft$^3$ | 2.3 |
| % Closed Cells | 88 |
| k-Factor Aging of 1" Thick Core Samples, Btu-in/hr-ft$^2$-°F. | |
| 1 Day | .136 |
| 21 Days | .174 |
| 59 Days | .176 |
| 91 Days | .180 |

[1] Of Example 1.
[2] Of Example 1.
[3] Polyol PS-2502A = reaction product of phthalic anhydride and diethylene glycol (DEG) having a hydroxyl number of 224-244, a viscosity at 25° C. of 2,500-3,000 cps, and 10-11% free DEG (Stepan Company).
[4] Of Example 1.

EXAMPLE 5

This example illustrates the synthesis of polyisocyanurate foams (10% trimer) utilizing as the sole blowing agent (a) CCl$_3$F and (b) CHClF$_2$.

A Hennecke foam machine was employed to prepare the foams from the ingredients and quantities thereof listed in the following Table V in accordance with the procedure described in Example 3. Characteristics of the foams produced are shown in the table. It is seen that CHClF$_2$ can be used as the sole blowing agent for the manufacture of polyisocyanurate foam having good qualities.

TABLE V

| PREPARATION OF POLYISOCYANURATE FOAM | | |
|---|---|---|
| | PARTS BY WEIGHT | |
| INGREDIENTS | A | B |
| A-Component | | |
| Mondur MR-200[1] | 170 | 170 |
| CCl$_3$F | 51 | — |
| CHClF$_2$ | — | 9 |
| Surfactant[2] | 2 | 2 |
| B-Component | | |
| Polyol Chardol 170[3] | 130 | 130 |
| CHClF$_2$ | — | 19 |
| C-Component | | |
| Catalyst[4] | 5.1 | 10.7 |
| FOAM PROPERTIES | | |
| Reactivity, sec (Firm) | 29 | 25 |
| Density, lb/ft$^3$ | 1.72 | 2.2 |
| % Closed Cells | 88.8 | 91 |
| E84 Test, (Core) flame spread/smoke | — | 25/163 |
| k-Factor Aging of 1" Thick Core Samples, Btu-in/hr-ft$^2$-°F. | | |
| 1 Day | .116 | .119 |
| 30 Days | .139 | — |
| 41 Days | — | .144 |
| 60 Days | .150 | — |
| 90 Days | .152 | — |
| 350 Days | .168 | — |
| 357 Days | — | .178 |

[1] Of Example 1.
[2] Of Example 1.
[3] Of Example 2.
[4] Of Example 1.

We claim:

1. In a process for the production of a rigid, closed-cell polyisocyanurate foam from a foam forming mixture comprising an organic polyisocyanate, a polyol, a blowing agent, and a catalyst, the improvement which comprises employing:
   (a) a polyester polyol as the sole polyol, and
   (b) chlorodifluoromethane or a mixture of chlorodifluoromethane and at least one co-blowing agent as the blowing agent, the chlorodifluoromethane comprising at least about 70 weight percent of any blowing agent mixture.

2. The process of claim 1 wherein the polyester polyol is an aromatic polyester polyol.

3. The process of claim 2 wherein the co-blowing agent is selected from the group consisting of water, air, nitrogen, carbon dioxide, readily volatile organic substances, compounds which decompose to liberate gases, and mixtures thereof.

4. The process of claim 2 wherein the co-blowing agent is selected from the group consisting of trichloromonofluoromethane, water, dichlorofluoroethane, dichlorotrifluoroethane, carbon dioxide, and mixtures thereof.

5. The process of claim 2 wherein the aromatic polyester polyol is the reaction product of a polycarboxylic acid component and an aliphatic diol of the formula:

HO—R—OH wherein R is a divalent radical selected from the group consisting of:
   (a) alkylene radicals each containing from 2 through 6 carbon atoms, and
   (b) radicals of the formula:

$-(R^1O)_m-R^1-$ wherein $R^1$ is an alkylene radical containing from 2 through 6 carbon atoms, and m is an integer of from 1 through 4, and
   (c) mixtures thereof.

6. The process of claim 2 wherein the acid component of the aromatic polyester polyol is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof.

7. In a rigid, closed-cell polyisocyanurate foam obtained by reacting an organic polyisocyanate with a minor amount of polyol in the presence of a blowing agent and a catalyst, the improvement comprising the polyol being solely a polyester polyol and the blowing agent being chlorodifluoromethane or a mixture of chlorodifluoromethane and at least one co-blowing agent, the chlorodifluoromethane comprising at least about 70 weight percent of any blowing agent mixture.

8. The foam of claim 7 wherein the polyester polyol is an aromatic polyester polyol.

9. The foam of claim 8 wherein the co-blowing agent is selected from the group consisting of water, air, nitrogen, carbon dioxide, readily volatile organic substances, compounds which decompose to liberate gases, and mixtures thereof.

10. The foam of claim 8 wherein the co-blowing agent is selected from the group consisting of trichloromonofluoromethane, water, dichlorofluoroethane, dichlorotrifluoroethane, carbon dioxide, and mixtures thereof.

11. The foam of claim 8 wherein the aromatic polyester polyol is the reaction product of a polycarboxylic acid component and an aliphatic diol of the formula:

HO—R—OH where R is a divalent radical selected from the group consisting of:
   (a) alkylene radicals each containing from 2 through 6 carbon atoms, and
   (b) radicals of the formula:

$-(R^1O)_m-R^1-$ wherein $R^1$ is an alkylene radical containing from 2 through 6 carbon atoms, and m is an integer of from 1 through 4, and
   (c) mixtures thereof.

12. The foam of claim 8 wherein the acid component of the aromatic polyester polyol is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof.

13. The foam of claim 8 wherein the organic polyisocyanate is selected from the group consisting of pure or crude toluene diisocyanates, polymethylene polyphenyl isocyanate, or blends of such isocyanates and isocyanate terminated prepolymers made from such isocyanates.

14. The foam of claim 13 wherein the isocyanate terminated prepolymers are made from the isocyanates and aromatic polyester polyols.

15. The foam of claim 8 which includes at least one additive selected from the group consisting of viscosity reducers, flame retardants, dispersing agents, plasticizers, mold release agents, antioxidants, compatibility agents, fillers and pigments.

16. A process for producing a laminate comprising (a) contacting at least one facing sheet with the foam-forming compositions of claim 1, and (b) thereafter foaming and curing the foam-forming composition.

17. A laminate comprising at least one facing sheet adhered to the polyisocyanurate foam of claim 7.

18. The laminate of claim 17 wherein the facing sheet is selected from the group consisting of kraft paper, aluminum, a glass mat, a glass reinforced organic felt, an asphalt impregnated felt, and a combination of two or more of the facing sheets.

19. The laminate of claim 17 wherein the polyisocyanurate foam is reinforced by glass fibers.

* * * * *